US011186282B2

(12) United States Patent
Hammoud (10) Patent No.: US 11,186,282 B2
(45) Date of Patent: Nov. 30, 2021

(54) AUTOMATED LANE CHANGE SYSTEM AND METHODS (71) Applicant: Alpine Electronics, Inc., Tokyo (JP)

(72) Inventor: Khoder Hammoud, Macomb, MI (US)

(73) Assignee: Alpine Electronics, Inc., Tokyo (JP)

( * ) Notice: Subject to any disclaimer, the term of this patent is extended or adjusted under 35 U.S.C. 154(b) by 147 days.

(21) Appl. No.: 16/216,733

(22) Filed: Dec. 11, 2018

(65) Prior Publication Data

US 2020/0180634 A1 Jun. 11, 2020

(51) Int. Cl.
*B60W 30/18* (2012.01)
*G08G 1/16* (2006.01)
*B60W 30/09* (2012.01)
*G05D 1/00* (2006.01)
*G05D 1/02* (2020.01)
*B60W 30/095* (2012.01)

(52) U.S. Cl.
CPC ...... *B60W 30/18163* (2013.01); *B60W 30/09* (2013.01); *B60W 30/0956* (2013.01); *G05D 1/0088* (2013.01); *G05D 1/0223* (2013.01); *G08G 1/167* (2013.01); *G05D 2201/0213* (2013.01)

(58) Field of Classification Search
CPC ........ B60W 30/18163; B60W 30/09; B60W 30/0956; B60W 2720/10; B60W 2554/802; B60W 2554/804; B60W 2554/801; B60W 2554/803; B60W 2552/53; G08G 1/167; G05D 1/0088; G05D 1/0223; G05D 2201/0213
See application file for complete search history.

(56) References Cited

U.S. PATENT DOCUMENTS

2017/0113696 A1* 4/2017 Oh ..................... G06K 9/00798
2018/0164817 A1* 6/2018 Herz .................. G01C 21/3685
2020/0050195 A1* 2/2020 Gross ............. B60W 60/00272

OTHER PUBLICATIONS

Fox, Dieter; Burgard, Wolfram; and Thrun Sebastian, "The Dynamic Window Approach to Collision Avoidance", Mar. 1997, IEEE, IEEE Robotics and Automation Magazine, p. 23-33 (Year: 1997).*

* cited by examiner

*Primary Examiner* — Aniss Chad
*Assistant Examiner* — Chase L Cooley
(74) *Attorney, Agent, or Firm* — Knobbe, Martens, Olson & Bear, LLP (57) ABSTRACT

Driver assistance systems and autonomous driving systems have been attractive to researchers in the automotive industry to reduce the number of accidents and to increase driving efficiency. One of the most challenging tasks to safely and effectively automate is changing between traffic lanes. The systems and methods of the present application include applications of the Dynamic Windows Approach algorithm to guide a vehicle through an automated lane change procedure with improved safety and efficiency.

33 Claims, 7 Drawing Sheets

AUTOMATED LANE CHANGE SYSTEM AND METHODS

TECHNICAL FIELD

The present disclosure relates to systems and methods for guiding a vehicle through an automated lane change procedure.

BACKGROUND

Studies have shown that changing lanes while driving results in approximately 10% of accidents caused by human drivers. As shown by the accident rate, lane changes are not simple procedures even for experienced human drivers. Similarly, fully or semi-autonomous vehicles run various risks to navigate complex and dynamic traffic situations when executing a lane change procedure. Thus there remains opportunity for improved methodologies and systems for navigating a vehicle through a lane change procedure in a safe and efficient manner.

SUMMARY

The present disclosure includes adaptations, applications, and improvements of the Dynamic Window Approach (DWA) algorithm for collision avoidance to execute an automated lane change procedure. The DWA algorithm was described in *The Dynamic Window Approach to Collision Avoidance*, by Dieter Fox, Wolfram Burgard, and Sebastian Thrun, *IEEE Robotics & Automation Magazine* (1997), the entirety of which is hereby incorporated by reference. The DWA algorithm takes place in the space of velocities and identifies a desired velocity vector for a vehicle to take towards a target goal. A trajectory of the vehicle to the target goal can be modeled as a series of velocity vectors for n time intervals. A velocity vector search space is compiled for a single time interval. The velocity vector search space contains possible velocity vectors for the vehicle. The search space is then restricted to eliminate inadmissible velocity vectors. The resulting search space is then optimized across an objective function to identify the desired velocity vector. The vehicle can proceed along the desired velocity vector for the time interval. This process can be repeated for the n time intervals to guide the vehicle to the target goal.

Another aspect of the present disclosure is that the DWA algorithm can take into account the dynamic and kinematic constraints (e.g., mass and acceleration capacities) of a moving vehicle. The velocity vector search space can be restricted to eliminate velocities that are unattainable given the mass and acceleration limitations of the vehicle.

Another aspect of the present disclosure is that the DWA algorithm can take into account collision avoidance. The velocity vector search space can be restricted to eliminate velocities that would likely cause the vehicle to collide with objects in the vicinity of the vehicle given the limited accelerations of the vehicle.

Another aspect of the present disclosure is that the DWA algorithm can take into account minimum and/or maximum admissible velocities, accelerations and/or jerks for the vehicle. The velocity vector search space can be restricted to eliminate velocities that will exceed the minimums and/or maximums admissible velocities.

Another aspect of the present disclosure is that the DWA algorithm can take into account limits to the radius of curvature for the vehicle trajectory. The velocity vector search space can be restricted to eliminate velocities that result in trajectories that would be inadmissible for safety or rider comfort reasons. The radius of curvature for the vehicle trajectory can be based on a minimum ratio of translational and rotational velocities and a proportion of a lane width (e.g., W1, W2).

Another aspect of the present disclosure is that the DWA algorithm can take into account the relative location of an adjacent lane to a lane of travel. The velocity vector search space can be restricted to eliminate ranges of rotational velocities based on the direction the vehicle should be turning to move towards the adjacent lane.

Another aspect of the present disclosure is that object function of the DWA algorithm can include a target heading function that represents alignment of the vehicle with the target goal, a clearance function that represents a distance between the vehicle and the closest intersecting object position and/or a velocity function that represents progress of the vehicle towards the target goal. Each of the functions of the objective functions can be weighted to customize the relative importance of each of the component functions.

Another aspect of the present disclosure is the use of a virtual goal to improve the heading of the vehicle as it approaches the adjacent lane. As the vehicle translates laterally from one lane of travel to the adjacent lane and passes a predetermined location, the target goal can be modified to be a virtual goal. The virtual goal can be in the adjacent lane (e.g., same x-coordinate as the target goal) but at a location ahead of the vehicle in the direction of the flow of traffic. In this manner, the trajectory of the vehicle within the adjacent lane can be smoothed and orient the heading of the vehicle with the flow of traffic. The virtual goal can remain ahead by increasing as the vehicle approaches the x-coordinate of the virtual goal. The y-coordinate of the virtual goal can be proportional to an inverse of a distance between the x-coordinate of the virtual goal and the x-coordinate of the vehicle in the x-direction. The lane change maneuver can be switched off when the vehicle is at a location that is within a predetermined threshold of the x-coordinate of the virtual goal.

BRIEF DESCRIPTION

DETAILED DESCRIPTION

The following disclosure describes systems and related methods and algorithms for executing an automated lane change procedure. Various approaches have been used to compute a lane change trajectory for a vehicle undergoing an automated lane change procedure. These previous approaches suffer from various limitations that prevent them from being safe and/or useful in an operational vehicle. In some previous approaches a lane change trajectory is com-"

puted but fails to take into account environmental changes (e.g., moving traffic or vehicles or other obstacles) during the course of the execution of the lane change procedure. Other approaches estimate the final positions of adjacent vehicles and other objects after the lane change procedure is complete but fail to take into account changes in the speeds or positions of objects surrounding the vehicle during the lane change procedure.

Still other approaches ignore or fail to account for certain aspects of the lane change procedures such as the lateral speed of the vehicle between lanes. Other approaches require too much processing time to provide useful instructions to a vehicle during the limited execution time of the lane change procedure. Other algorithms and systems require prior information about the locations of objects in the vicinity of the vehicle and the layout of the traffic lanes. Accordingly, there exists a need for an improved lane change procedure for vehicles.

Lane Change Overview

Figure 1A:
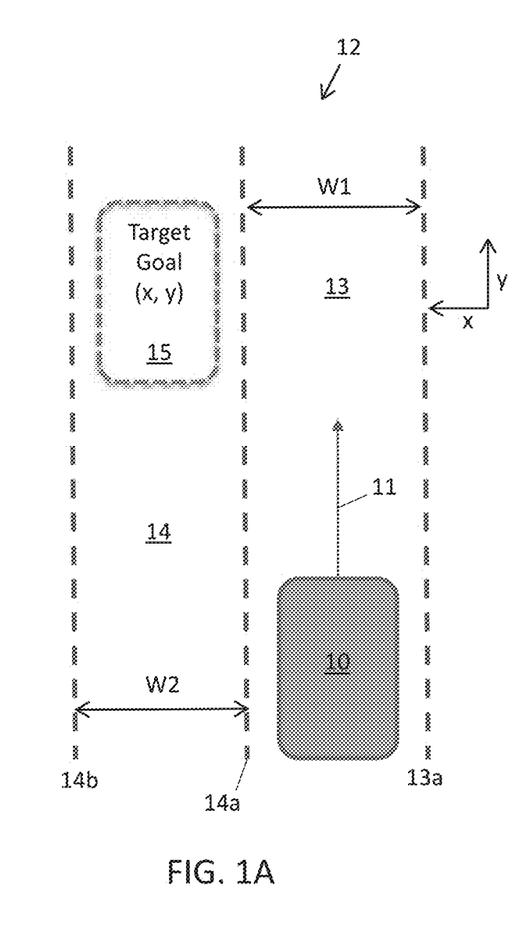
FIGS. 1A-1C show a schematic representation of an automated lane change procedure.
Figure 1B:
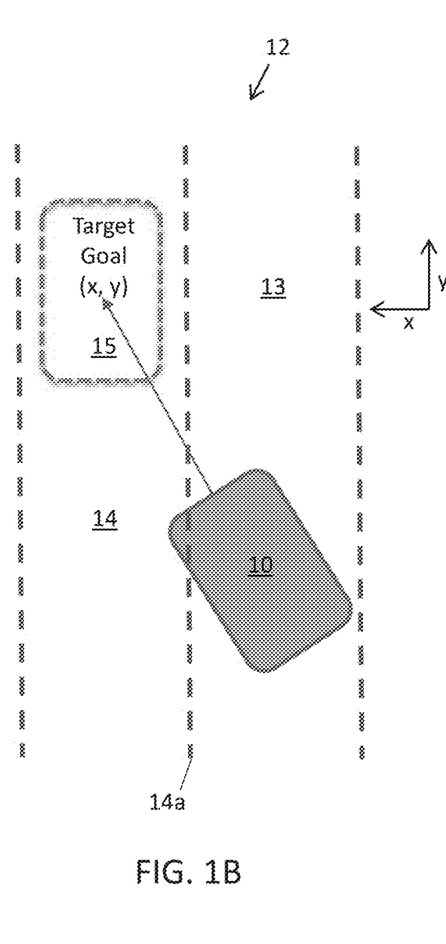
Figure 1C:
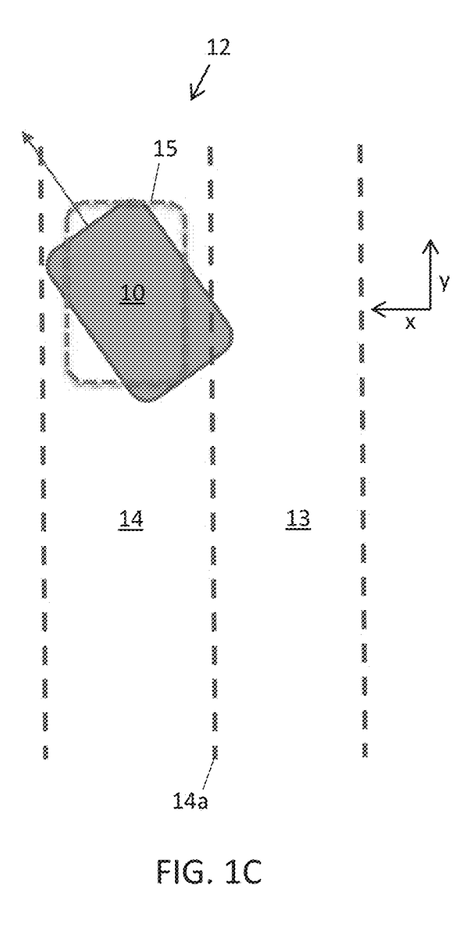

FIGS. 1A-1C illustrate a schematic representation of a vehicle 10 in a roadway 12. The vehicle 10 can be configured to navigate the roadway 12 along a trajectory 11. The trajectory 11 can comprise a velocity vector including a translational velocity and a rotational velocity.

The roadway 12 can include multiple lanes. The roadway 12 can include a travel lane 13 in which the vehicle 10 is travelling. An adjacent lane 14 can be directly or indirectly adjacent to the travel lane 13 on either side thereof. The adjacent lane 14 can be separated from the travel lane 13 by a marker 14a. The marker 14a can be a line, series of lines, or other permanent or temporary markers on the roadway 12. One or more additional lane markers 14b, 13a can further demarcate the travel lane 13 and/or the adjacent lane 14.

The travel lane 13 and adjacent lanes 14 can carry traffic travelling in the same direction or in opposite directions. The traffic in the travel lane 13 can flow generally in a y-direction. The travel lane 13 can have a width W1. The adjacent lane 14 can have a width W2. The widths W1, W2 can extend in an x-direction. The x-direction and the y-direction can be perpendicular. The lane widths W1, W2 can be measured (such as by the sensors 20 or lane sensor 40) or assumed based on standard, measured or known lane widths for the roadway 12.

The vehicle 10 can execute the automated lane change procedure to change from the travel lane 13 to the adjacent lane 14. FIG. 1A-1C illustrate the vehicle 10 executing the automated lane procedure by identifying a target goal 15 in the adjacent lane 14 while the vehicle is travelling in the lane 13. This target goal 15 can include an x and y coordinate. The target goal 15 can be identified based, in whole or part, on the widths W1, W2 of either or both of the lanes 13, 14 and/or the speed of the vehicle 10 in the y-direction. The target goal 15 can be approximately centered within the adjacent lane 14 (e.g., centered within 10% of width W2).

The vehicle 10 can execute the automated lane procedure by travelling towards the target goal 15. The automated lane change procedure can include calculating a velocity or series of velocities over a timeframe using the Dynamic Window Approach (DWA) algorithm that will safely navigate the vehicle 10 to the target goal 15. The trajectory 11 of the vehicle 10 can be accelerated to match the calculated velocities of the DWA algorithm.

As shown in FIG. 1C, the vehicle 10 can reach the target goal 15 by crossing the lane marker 14a and entering the adjacent lane 14. The automated lane change procedure can terminate when the vehicle 10 has reached the target goal 15 or arrived within a predetermined threshold thereof.

Figure 2A:
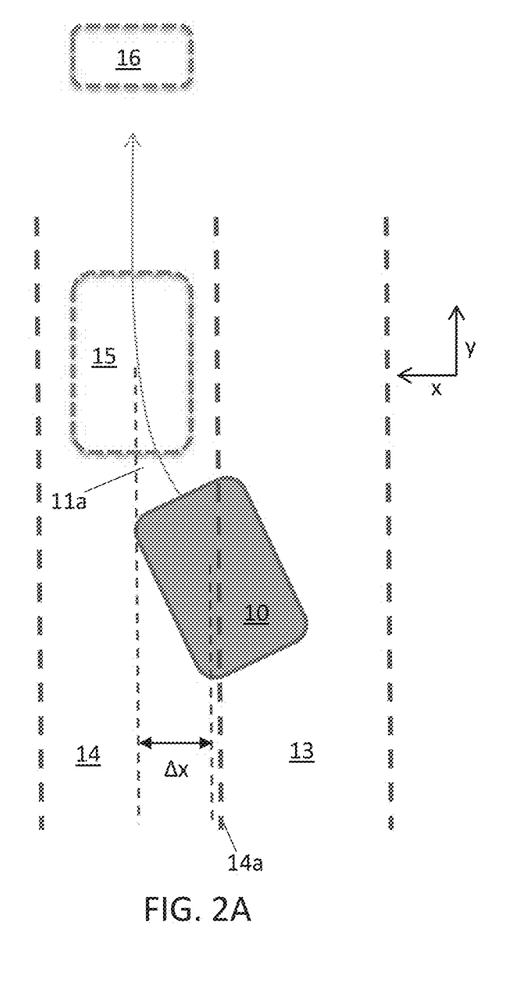
FIGS. 2A-2B show a schematic representation of another aspect of the automated lane change procedure.
Figure 2B:
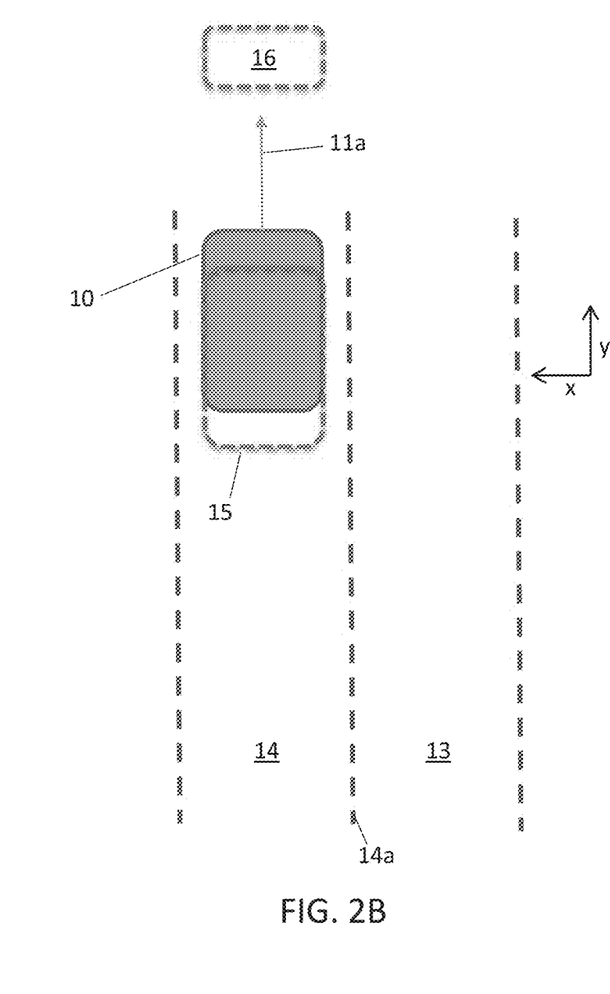

FIGS. 2A and 2B show a variation of the above automated lane change procedure. During the automated lane change procedure, the target goal 15 is modified into a virtual goal 16. The virtual goal 16 can include an x coordinate and a y coordinate. The x coordinate can be located within the adjacent lane 14. Optionally, the x coordinate can be the same as the x coordinate of the target goal 15. The y coordinate of the virtual goal can be set ahead of the vehicle 10. The y coordinate can increase exponentially. The y-coordinate can increase as the vehicle approaches the x-coordinate of the virtual goal 16. In one implementation the y-coordinate can increase proportional to an inverse of a distance (fix) between the vehicle 10 and the x-coordinate of the virtual goal.

The automated lane change procedure can switch from the target goal 15 to the virtual goal 16 at a predetermined location. The switch to the virtual goal 16 can be based on the position of the vehicle 10 relative to the adjacent lane 14, the travel lane 13, or any of the lane markers 14a, 14b, 13a. In one implementation, the switch to the virtual goal 16 occurs as the vehicle 10 crosses the lane marker 14a. In another implementation, the switch to the virtual goal 16 can be time based, velocity based, location based, a combination thereof, or other factor.

The effect of the virtual goal 16 can be to smooth the transition of the vehicle 10 into the adjacent lane 14. As shown in FIG. 1C, the trajectory 11 of the vehicle 10 can be misaligned with the traffic flow in the adjacent lane 14 at the point it reaches the target goal 15. The vehicle 10 can then be left to correct its trajectory 11. This can be problematic for safety reasons (e.g., traffic flow), as well as dynamically difficult given physical limitations of automobiles. Moreover, quick changes in acceleration to match the flow of traffic can cause passenger discomfort. Accordingly, the use of the virtual goal 16 can gradually realign the vehicle 10 with the flow of traffic. At the end of the automated lane change procedure, the trajectory 11a can be sufficiently aligned with the traffic flow in adjacent lane 14. The tangent of the trajectory 11 can be aligned with the direction of traffic.

Vehicle Overview

Figure 3:
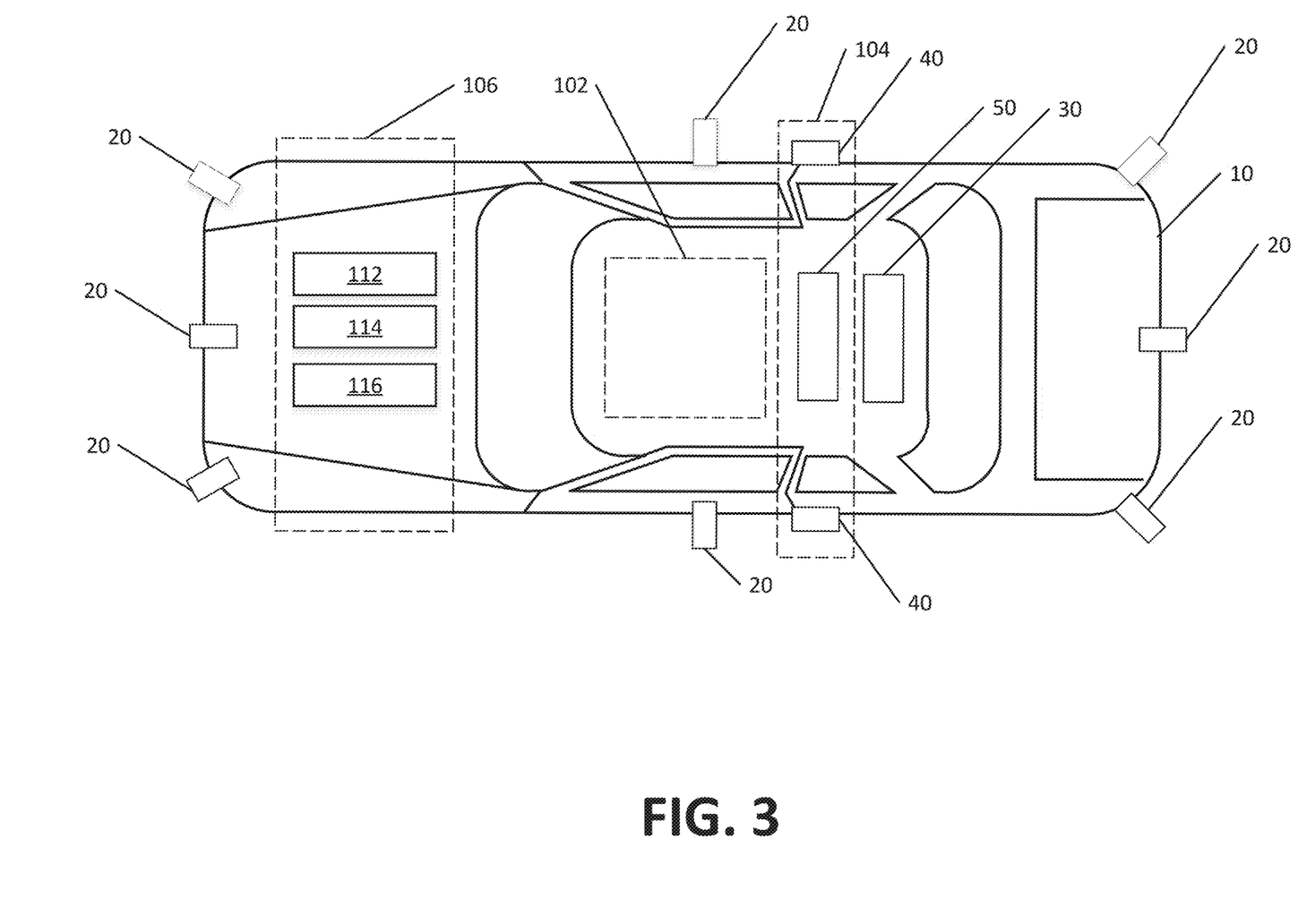
FIG. 3 is a schematic embodiment of a vehicle.

FIG. 3 illustrates a schematic embodiment of a vehicle 10. The vehicle 10 can be an automobile, such as a 2-wheel, 4-wheel or other type of automobile. The vehicle 10 can be fully autonomous, semi-autonomous, or user-piloted (e.g., partially or optionally user-piloted). The vehicle 10 can be designed to navigate the roadway 12 having multiple lanes of traffic and execute the automated lane change procedure to change from the travel lane 13 to the adjacent lane 14, or otherwise execute the procedures and methods described herein and further below.

The vehicle 10 can include a vehicle maneuvering system 106. The vehicle maneuvering system 106 can include a motive power system 112, a steering system 114, and/or a brake system 116. The power system 112 can control acceleration of the vehicle 10. The power system 112 can include an engine. The engine can be an internal combustion engine, an electric motor, a hybrid engine/motor, or other engine type. The engine can be fueled by gasoline, diesel, natural gas, battery power, solar power, fuel cell, alcohol fuel cell, hydrogen fuel cell, metal fuel cell, or any other fuel source. The engine can output a torque. The power system 112 can include transmissions, tires, wheels or similar components for transferring the torque to the roadway to provide acceleration to the vehicle 10.

The steering system 114 can control a heading of the vehicle 10. The steering system 114 can include a steering mechanism and/or suspension for maneuvering one or more of the tires of the power system 112. The steering system 114 can include a steering column and/or suspension and related assemblies for turning the tires.

The brake system 116 can control acceleration of the vehicle 10. The brake system 116 can include brakes for stopping or slowing the tires. The brakes can be disc, drum, engine, magnetic or any suitable brake type for the vehicle 10.

The vehicle 10 can include a vehicle control system 102. The vehicle control system 102 can output a driving control signal to the vehicle maneuvering system 106. The vehicle maneuvering system 106 can execute the automated lane change procedure. The vehicle control system 102 can receive one or more inputs from a sensor system 104.

The sensor system 104 can include a communication system 30. The communication system 30 can communicate with external communications systems, networks, and/or other vehicles. The communication system 30 can include a GPS or global navigation system. The vehicle communication system 30 can receive and/or send data (e.g., from a satellite or other remote communication network) about a location of the vehicle and with respect to the global navigation system. The vehicle 10 can include a user interface for viewing and interacting with the global navigation system, such as through a map/routing interface.

The communication system 30 can receive and/or send data to other vehicles in the vicinity of the vehicle 10 (e.g., vehicle-to-vehicle (V2V) communication). The V2V communications can include data about the current or planned positions, velocities, and or accelerations of the other vehicles. The data received by the communication system 30 can be used by the vehicle control system 102 to calculate the driving control signal for the vehicle maneuvering system 106.

The sensor system 104 can include various types of sensors that aid in the navigation of the vehicle 10. These sensors can include proximity sensors 20, lane sensors 40, and/or vehicle sensors 50. The proximity sensors 20 can measure the relative positions, velocities and/or accelerations of objects in the vicinity of the vehicle 10. Exemplary embodiments of proximity sensors 20 include, but are not limited to radar, LIDAR, cameras/CCDs, light detectors, ranging systems, etc. In some implementations, the proximity sensors 20 can be placed around one or more portions of the vehicle 10, such as inside, outside, on a roof, front, back and/or sides of vehicle 10. The proximity sensors 20 can detect objects that are either stationary or moving in the frame of reference of the vehicle 10. The vehicle control system 102 can calculate the driving control signal based on data from the proximity sensors 20. The vehicle 10 can avoid obstacles in the vicinity of the vehicle 10 based on the data from the proximity sensors 20.

The lane sensor 40 can detect a location of the vehicle 10 relative to a lane marker (e.g., lane marker 14a). The lane marker 14a can demarcate between adjacent lanes on the roadway on which the vehicle 10 is traveling. In some implementations, the lane sensor 40 can include a camera or other optical sensor. The lane sensor 40 can detect any or all of the lane markers 14a, 14b, 13a. The vehicle control system 102 can calculate the driving control signal based on data from the lane sensor 40. The vehicle control system 102 can direct the vehicle 10 to stay within the lane of travel 13 based on data form the lane sensor 40.

The vehicle sensors 50 can monitor motion of the vehicle 10. The vehicle sensors 50 can include one or more inertial, speed, heading, or other sensor type for measuring motion of the moving vehicle 10. The vehicle sensors 50 can include sensors of the vehicle maneuvering system 106. The vehicle sensors 50 can measure motion directly (e.g., measuring the actual motion of the vehicle 10), indirectly (e.g., via the GPS or global navigation system) or a combination of both (e.g., speedometer measures speed of the vehicle and direction is measured through the GPS). The vehicle sensors 50 can calculate and/or measure the position, velocity, acceleration and/or change in acceleration with respect to time (jerk) of the vehicle 10. The vehicle sensors 50 can measure an angular velocity, angular acceleration and/or angular jerk around a vertical axis of the vehicle 10. The vehicle sensors 50 can calculate and/or measure a translational velocity vector in one or more directions for the vehicle 10 (e.g., x-direction, y-direction). The vehicle sensors 50 can calculate and/or measure a translational acceleration and/or translational jerk for the vehicle 10 in the one or more directions.

Figure 4:
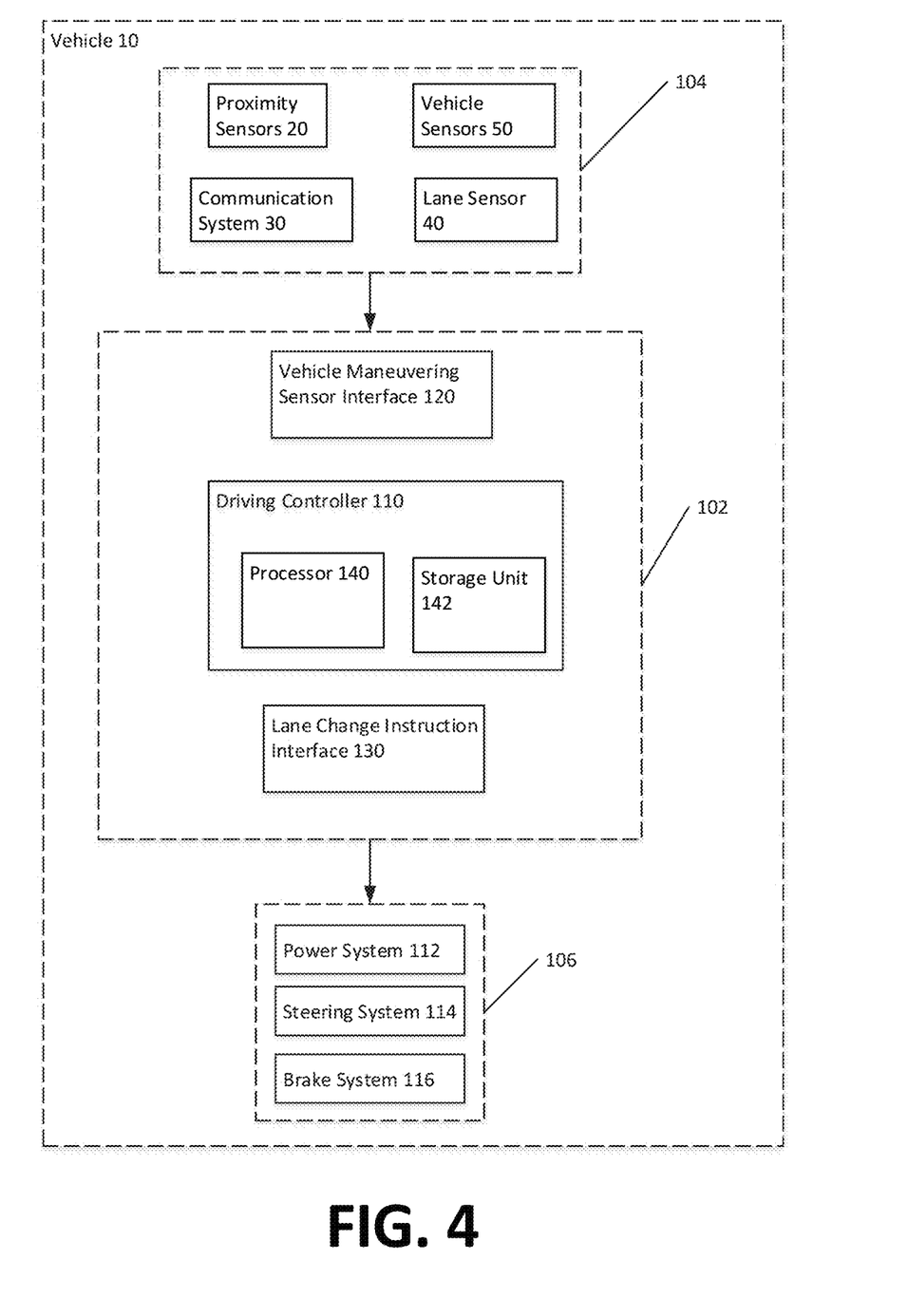
FIG. 4 is a block diagram of the vehicle of FIG. 3.

With reference to FIG. 4, the vehicle control system 102 can generate the driving control signal for modifying or continuing operation of the vehicle maneuvering system 106 to navigate the vehicle 10. The vehicle control system 102 can include a vehicle sensor interface 120, a driving controller 110, and a lane change instruction interface 130. The driving controller 110 can include a processor 140 and a computer-readable storage medium 142.

The vehicle sensor interface 120 can receive signal data from the communication system 30 (e.g., V2V communications) or any of the sensor systems 104. The signal data can be received by the processor 140. The processor 140 can execute navigation instructions stored on the medium 142 based on the signal data. The navigation instructions can generate the driving control signal to autonomously navigate the vehicle 10 along a trajectory. The trajectory can avoid collision with objects in the vicinity of the vehicle 10 and guide the vehicle 10 towards a destination or along a route.

The driving control signal can be received by the vehicle maneuvering system 106 to operate the vehicle 10 along the trajectory. The vehicle maneuvering system 106 can receive the vehicle control signal and accelerate (e.g., brake, steer, or power up or down) the vehicle 10 based on the vehicle control signal.

The lane change instruction interface 130 can receive a lane change instruction to change a lane of the vehicle 10. The lane change can be from the current lane of travel 13 to the adjacent lane of travel 14 (e.g., direct or indirect). The lane change instruction can be received from a user of the vehicle 10 (such as through a user interface within a cockpit of the vehicle 10) or from the processor 140 executing the navigation instructions.

Example Automated Lane Change Procedure

An automated lane change procedure can be executed as a part of the trajectory of the vehicle 10. The processor 140 can execute the navigation instructions according to the automated lane change procedure. The automated lane change procedure can be based on the DWA algorithm. The DWA algorithm can be executed based on the signal data from the sensor systems 104, and/or known physical characteristics or limitations of the vehicle 10 or roadway 12, as described further below.

The automated lane change procedure can navigate the vehicle 10 from the travel lane 13 to the adjacent lane 14. The lane change procedure can be used to avoid an obstacle in the roadway, to respond to changes in the roadway or traffic, to prepare for upcoming turns, to avoid emergency vehicles, to comply with the legal requirements or signage, or for other reasons.

In the DWA algorithm, the search for commands controlling the vehicle is carried out directly in the space of velocities. The dynamics of the vehicle can be incorporated into the algorithm by reducing the search space including possible velocity vectors to those velocities which are reachable under the dynamic constraints of the vehicle 10. In addition, only velocities which are safe with respect obstacles in the vicinity of the vehicle can be considered. This pruning of the search space is done in the first step of the algorithm. In a second step, a velocity maximizing objective function is applied across the remaining velocities to select a desired velocity vector for the vehicle. This cycle can be repeated iteratively throughout the execution of the automated lane change procedure. This can generate a series of desired velocity vectors that guide the vehicle towards a desired goal (e.g., target goal 15) along the trajectory.

Velocity Vector Search Space

The DWA algorithm can direct the vehicle 10 towards a desired goal along the desired velocity vector. The DWA algorithm can be a part of the navigation instructions executed by the driving control system 102. The desired velocity vector calculated by the DWA algorithm can be used to calculate the driving control signal. The driving control signal can be executed by the vehicle maneuvering system 106. The DWA algorithm can be run iteratively during the automated lane change procedure to update the vehicle trajectory in response to the roadway 12 and vehicle 10 conditions.

Figure 5:
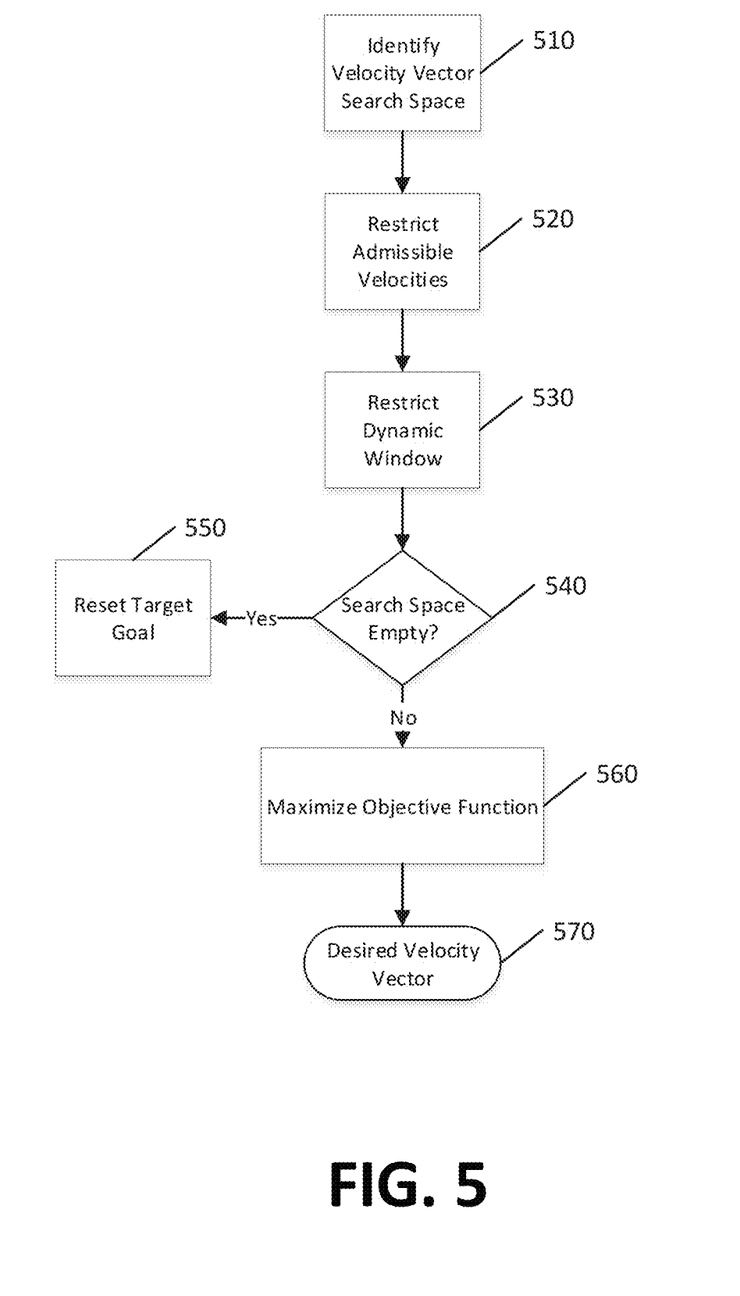
FIG. 5 is a flowchart of a DWA algorithm for the automated lane change procedure.

FIG. 5 is a flow diagram depicting one cycle of the DWA algorithm to compute a desired velocity vector for the vehicle 10. At step 510, a trajectory of the vehicle can be approximately modelled as a sequence of piecewise curvatures. Each curvature is uniquely determined by a velocity vector (v, w). The following equations are one implementation of a curvature for time $t_0$-$t_n$:

$$x(t_n) = x(t_0) + \sum_{i=0}^{n-1} (F_x^i(t_{i+1}))$$

$$F_x^i(t) = \begin{cases} \frac{v_i}{\omega_i}(\sin \theta(t_i) - \sin(\theta(t_i) + \omega_i \cdot (t - t_i))), & \omega_i \neq 0 \\ v_i \cos(\theta(t_i)) \cdot t, & \omega_i = 0 \end{cases}$$

$$y(t_n) = y(t_0) + \sum_{i=0}^{n-1} (F_y^i(t_{i+1}))$$

$$F_y^i(t) = \begin{cases} -\frac{v_i}{\omega_i}(\cos \theta(t_i) - \cos(\theta(t_i) + \omega_i \cdot (t - t_i))), & \omega_i \neq 0 \\ |v_i \sin(\theta(t_i))| \cdot t, & \omega_i = 0 \end{cases}$$

where $x(t_0)$ and $y(t_0)$ are initial positions of the vehicle. When ω=θ, the curvature can be a straight line.

To generate a trajectory towards the desired goal, the vehicle can determine one velocity vector (v, w) for each of the n time intervals between $t_0$ and $t_n$. The search space for these vectors is exponential in the number of the considered intervals. To make the optimization feasible, each cycle of the DWA algorithm considers exclusively the first time interval and assumes that the velocities in the remaining n−1 time intervals are constant. This is equivalent to assuming zero accelerations in $[t_1; t_n]$. This simplification is motivated by the observations that: (a) the reduced search space is two-dimensional and thus tractable; (b) the search is repeated after each time interval; and (c) the velocities will automatically stay constant if no new commands are given.

At step 520, the velocity vector search space is restricted to admissible velocities. Restricting the velocity vector search space can increase the efficiency of the DWA algorithm, particularly for maximizing the objective function. The system can restrict the velocity vector search space based on collision avoidance. Obstacles in the vicinity of the vehicle impose restrictions on the rotational and translational velocities available for the vehicle. For example, the maximal admissible speed, modeled on a curvature, depends on the distance to the next obstacle on this curvature. The system assumes that for a velocity vector (v, w) the term dist(v, w) represents the distance to the closest obstacle on the corresponding curvature. A velocity is considered admissible, if the vehicle is able to stop before it reaches this obstacle based on known accelerations of the vehicle (e.g., through the brake system 116).

The set $V_a$ of admissible velocities can be defined as:

$$V_a = \{(v, \omega) \mid v \leq \sqrt{2 \cdot dist(v, \omega) \cdot \dot{v}_b} \\ \wedge \;\; \omega \leq \sqrt{2 \cdot dist(v, \omega) \cdot \dot{\omega}_b}\}$$

where $V_a$ is the set of velocities (v, w) which allow the vehicle to stop without colliding with one or more obstacles.

The obstacles can be moving or stationary relative to the vehicle. The system can calculate the dist(v, w) based on data about the objects from any of the sensing systems 104. In one implementation, the sensors 20 can receive data about the relative location, velocity, and/or acceleration of an adjacent object. The navigation instructions can use the data from the sensor systems 104 to calculate dist(v,w). Optionally, the location, velocity, and/or acceleration of the obstacles can be based on data from a previous time frame (e.g., relative velocity calculated from two position readings at two different times). In another implementation, the communication system 30 can receive data about the relative location, velocity, and/or acceleration of the obstacles (e.g., via V2V communications). The navigation instructions can use the received data to calculate dist(v, w). Optionally, the system can simplify the calculation of dist(v, w) based on the assumption that one or more of the position, velocity or acceleration of the obstacles are constant for the time window.

The admissible velocities can be based on admissible thresholds (e.g., maximum or minimum velocities, acceleration, or jerk). High levels of jerk are associated with rider discomfort when driving. Accordingly, the system can restrict the velocity vector search space based on a maximum jerk. Jerk is defined as the second time derivative of velocity. Accordingly, the system can restrict velocities from the velocity vector search space that would result in jerk above an admissible level. The jerk for each velocity vector can be measured or calculated based on data from the sensor systems 104 and/or changes in acceleration from previous cycles of the DWA algorithm.

To ensure a smooth ride for the vehicle and/or to accommodate safe driving limits for the vehicle, the vehicle can be limited to undergo a trajectory having a minimum radius of curvature. Accordingly, the system can restrict from the search space velocity vectors that result in trajectories over an admissible radius of curvature. In one implementation, the admissible radius of curvature can be a minimum length such as 1, 5, 10, 100, 500, or 1000 meters. In another implementation, the admissible radius of curvature can be calculated based on a ratio of translational velocity to angular velocity and a proportion of a lane width. The proportion can be 1, 5, 10, 100, 500, or 1000. Other minimum values, ratios, and proportions can alternatively be used.

A further restriction of the admissible velocity vector search space can be based on the relative location of the lanes. The system can restrict the velocity vector search space based on the relative location of the adjacent lane 14 to the lane of travel 13. Where the vehicle should move into a right-hand lane, velocities corresponding to negative angular accelerations or ranges of negative angular accelerations above an admissible threshold can be restricted. Where the vehicle should move into a left-hand lane, velocities corresponding to positive angular accelerations or ranges of positive angular accelerations above an admissible threshold can be restricted.

In another implementation, the velocity vector space can be restricted differently based on the location of the vehicle relative to the lane marker 14a, or any other lane marker. In one implementation, the system can restrict velocity vectors corresponding to angular acceleration above an admissible threshold once the vehicle is detected by the lane sensor 40 to have crossed the lane marker 14a. Alternatively, the system can restrict velocity vectors corresponding to angular acceleration above an admissible threshold before the vehicle has crossed the lane marker 14a.

At step 530, the velocity vector search space can be reduced to the dynamic window which contains only the velocities that can be reached within the next time interval. This takes into account the limited acceleration capacity of the vehicle. The vehicle has a mass, momentum, friction, roadway and various limitations of the vehicle maneuvering systems 106. The limitations of the vehicle maneuvering systems 106 can include maximum possible and/or maximum desirable accelerations or velocities (positive and/or negative) in rotational and/or translational directions.

The dynamic window $V_d$ can be defined as:

$$v_d = \{(v, \omega) | v \in [v_a - \dot{v} \cdot t, v_a + \dot{v} \cdot t] \wedge \omega \in [\omega_a - \dot{\omega} \cdot t, \omega_a + \dot{\omega} \cdot t]\}$$

where $\dot{v}$ and $\dot{w}$ are known from the vehicle system and $(v_a, w_a)$ are the actual velocity of the vehicle. The dynamic window is centered around the actual velocity and the field of potential velocities depend on the accelerations that can be exerted by the vehicle. Thus, all curvatures outside the dynamic window that cannot be reached within the next time interval are thus restricted from the velocity vector search space.

Let $V_s$ be the space of possible velocities, then the area $V_r$, the restricted velocity vector search space is defined as the intersection of the restricted areas, namely:

$$V_r = V_s \cap V_a \cap V_d$$

Figure 6A:
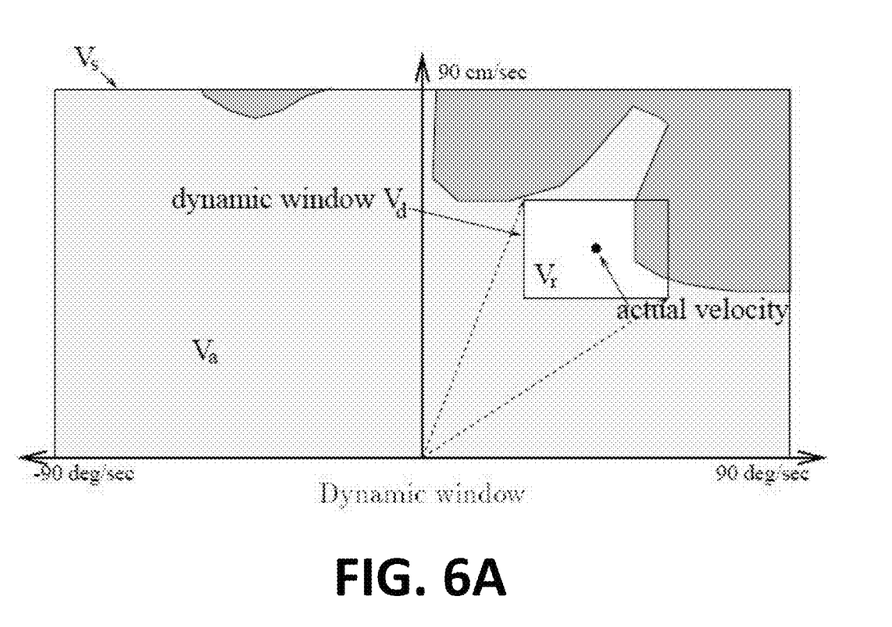
FIG. 6A shows the Dynamic Window on a velocity chart as used in the DWA algorithm.

The above given restrictions imposed on the search space for the velocities result in the area $V_r$ within the dynamic window (shown in the white rectangle in FIG. 6A).

At step 550, the system checks if there are any velocities in the velocity vector search space. If yes, the system continues with step 560. If no, the system can reset the target goal 15 to the lane of travel 13. The automated lane change procedure can then proceed to return the vehicle to the lane of travel 13 using the DWA algorithm and control system 102. In some implementations, the automated lane change procedure can direct the vehicle 10 back into lane 13 if, at any time during the automated lane change procedure, the vehicle 10 detects an obstacle that is over a threshold width in the adjacent lane 14 or otherwise blocking the target goal 15. The threshold can be greater than 40% of the width W2.

Maximizing the Objective Function

After identifying and restricting the velocity vector search space, the desired velocity vector is selected by optimizing the objective function G(v, w) across the resulting vector search space $V_r$:

$$G(v, \omega) = \sigma(\alpha \cdot \text{heading}(v, \omega) + \beta \cdot \text{dist}(v, \omega) + \gamma \cdot \text{velocity}(v, \omega))$$

where $\alpha$, $\beta$ and $\gamma$ and $\gamma$ are constants normalized to [0; 1].

Figure 6B:
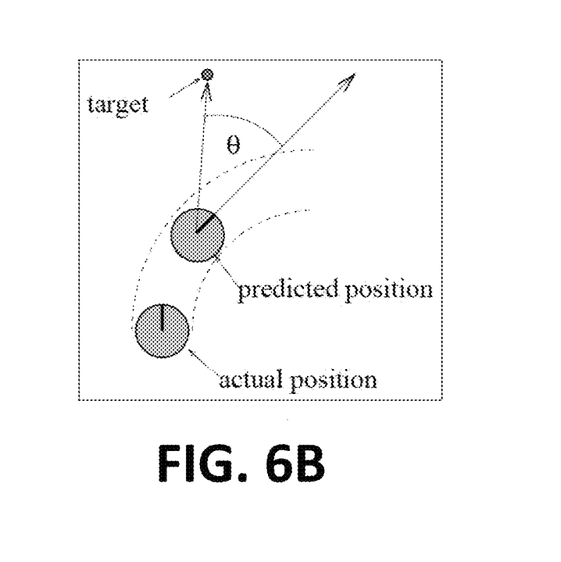
FIG. 6B shows a diagram for a vehicle heading relative to the target in the DWA algorithm.

The target heading function heading (v, w) measures the alignment of the vehicle with the target goal 15. In one implementation the heading is given by 180−θ, where θ is the angle of the target point relative to the vehicle's heading direction (as shown in FIG. 6B). Since this direction changes with the different velocities, θ can be computed for a predicted position of the vehicle. To determine the predicted position, the system can assume that the vehicle moves with the selected velocity during the next time interval.

For a realistic measurement of the target heading, the system can consider the dynamics of the rotation of the vehicle 10. Therefore, θ is computed at the position, which the vehicle will reach when exerting maximal deceleration after the next interval. This yields a smooth turning to the target in the behavior of the vehicle when it has circumvented the obstacle.

The clearance function dist(v, w) represents the distance to the closest obstacle that intersects with the curvature. If there is no obstacle that intersects with the curvature, the clearance function can be set to a large constant.

The velocity function velocity(v, w) is used to evaluate the progress of the vehicle on the corresponding trajectory as the vehicle advances towards the target goal. The velocity function can be a projection of the translational velocity vector.

The weighted sum of the target heading, the clearance and the velocity functions can assist the vehicle in navigating towards the target goal 15. The balance of the target heading, the clearance and the velocity functions can adjust by the constants $\alpha$, $\beta$, and $\gamma$. In one experimental application, favorable results were obtained for $\alpha$=0.8, $\beta$=0.1 and $\gamma$=0.1.

Automated Lane Change Procedure with Virtual Goal

Figure 7:
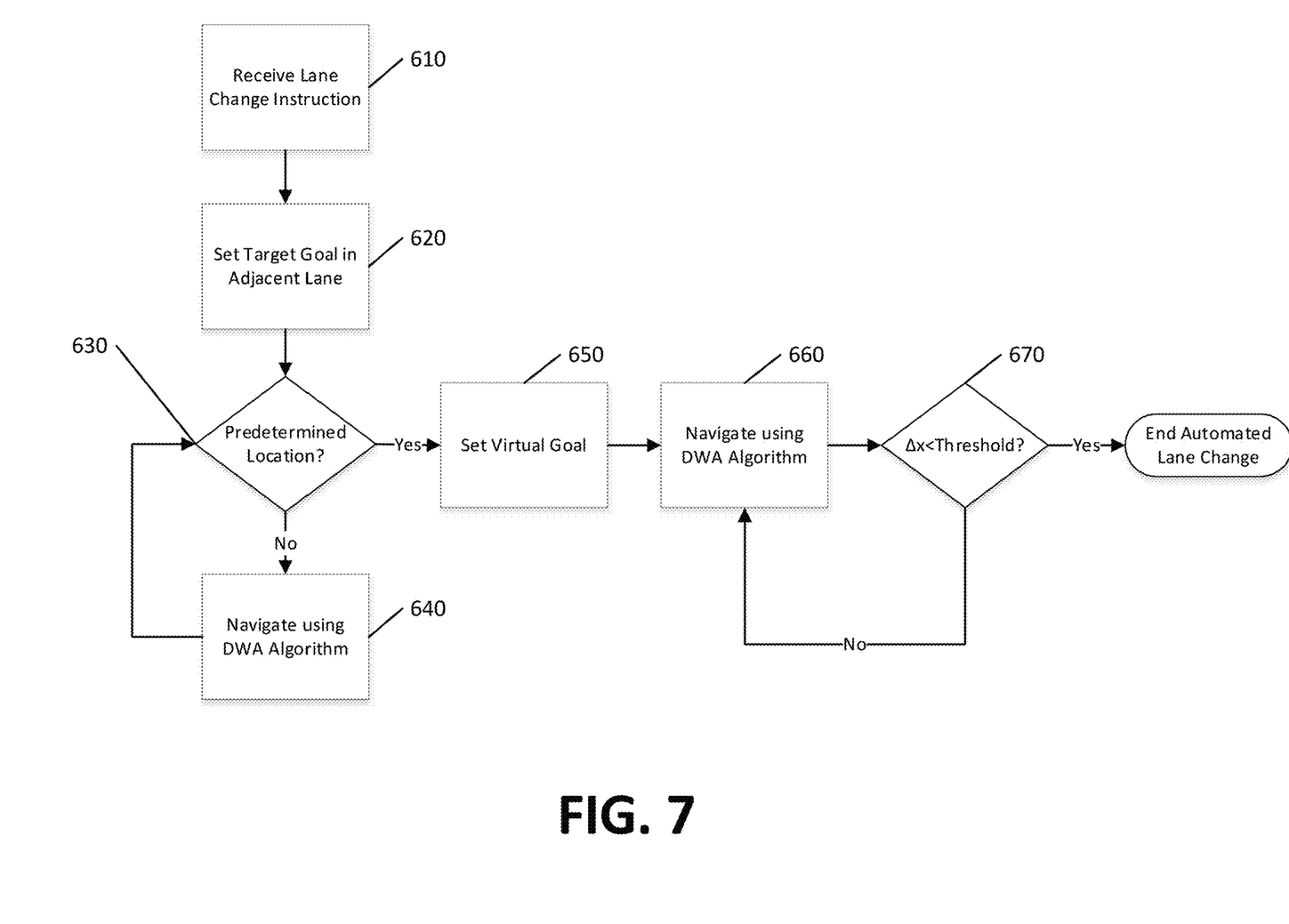
FIG. 7 is a flowchart of the automated lane change procedure.

FIG. 7 is a flowchart showing a variation of a lane change procedure. At step 610, the system can receive a lane change instruction. The lane change instruction can be received through the lane change instruction interface 130. The lane change instruction can be from the control system 104 or from the user. The system can initiate the lane change procedure based on receiving the lane change instruction.

At step 620, the system can set the target goal 15 in the adjacent lane 14. The target goal 15 can be set at an x-coordinate that is located substantially centered in the adjacent lane 14. The target goal 15 can be set at a y-coordinate that is ahead of the vehicle 10. The y-coordinate can be based on the speed of the vehicle in the y-direction, such that the vehicle can reach the target goal 15.

At step 630, the lane sensor 40, communication system 30, vehicle sensor 50, the communication system 30 (e.g., GPS) or other system of the vehicle 10 can detect or measure the location of the vehicle 10 relative to a predetermined location. The predetermined location can be at the lane marker 14a, at a location within the adjacent lane 14, at a location within the travel lane 13, or another location in the roadway 12. In one implementation, the predetermined location can be when the vehicle is partially or fully over the lane marker 14a or within a center threshold thereof (e.g., 10%). In another implementation, the predetermined location can be based on user input, time elapsed, location, or any combination thereof.

If the vehicle is not at the predetermined location at step 630, at step 640 the system can navigate towards the target goal 15. The vehicle maneuvering system 106 can execute the driving instructions generated by the vehicle controller 102 executing the DWA algorithm to approach the target goal 15. The condition of step 630 can be checked at repeated intervals until the vehicle reaches or surpasses the predetermined location or the automated lane change procedure is aborted.

If the vehicle is at or beyond the predetermined location at step 630, at step 650 the system replaces the target goal 15 with the virtual goal 16. The DWA algorithm can be calculated using the virtual goal 16. That is the virtual goal 16 coordinates can replace the target goal coordinates in the DWA algorithm. The virtual goal 16 can include an x-coordinate in the adjacent lane 14. The x-coordinate can be the same or substantially the same as the x-coordinate of the target goal 15. The virtual goal 16 can include a y-coordinate in the adjacent lane 14. The y-coordinate can be ahead of the vehicle 10. The y-coordinate can increase as the vehicle approaches the x-coordinate of the virtual goal 16. In one implementation, the y-coordinate can increase proportional to an inverse of a distance ($\Delta x$) between the vehicle 10 and the x-coordinate of the virtual goal:

$$V_y \propto \text{EXP}(1/\Delta x)$$

where $V_3$, is the y-coordinate of the virtual goal 16.

At step 660, the system can navigate the vehicle 10 towards the virtual goal 16. This trajectory can be gradual and/or smooth because of the location of the virtual goal 16. The vehicle maneuvering system 106 can execute the driving instructions generated by the vehicle controller 102 executing the DWA algorithm to approach the virtual goal 16.

At step 670, the system can check if the vehicle is within a predetermined threshold of the x-coordinate of the virtual goal 16. The system can compare the x-coordinate of the vehicle 10 location relative the x-coordinate of the virtual goal 16($\Delta x$). If $\Delta x$ is below a predetermined threshold, the automated lane change procedure can end. The predetermined threshold can be a percentage of the lane width W2 (e.g., $\Delta x$<10% of lane width W2.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Language of example or capability used herein, such as, among others, "can," "could," "might," "may," "e.g.," "some," "certain," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown and described features as applied to various example embodiments, omissions, substitutions, additions, and changes in the form and details of the devices or algorithms described can be made without departing from the spirit of the disclosure. Certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system for directing a vehicle during an automated lane change maneuver on a multi-lane roadway comprising:
   a lane change instructions interface configured to receive an instruction to change a lane of vehicle travel from a user or from an automated driving controller;
   a vehicle sensor interface configured to receive a geospatial location of the vehicle, a position of the vehicle relative to at least one lane marker, and positions of objects in a vicinity of the vehicle;
   a vehicle maneuvering system comprising a motive power control, a steering control, and a brake system wherein the vehicle maneuvering system is configured to receive a driving control signal to adjust at least one of the motive power control, the steering control, and the brake system to cause the vehicle to attain a desired velocity vector;
   a vehicle control system comprising a hardware processor connected to a memory system comprising instructions executable by the hardware processor, wherein the instructions, when executed by the hardware processor, are configured to cause the system to:
   receive the instruction to change a lane of vehicle travel to an indicated lane comprising traffic moving in a direction of vehicle travel;
   receive the positions of objects in a vicinity of the vehicle from the vehicle sensor interface;
   determine a target goal in the indicated lane;
   select a first desired velocity vector for directing the vehicle toward the target goal by:
      identifying a velocity vector search space based on potential translational and rotational velocities of the vehicle to be achieved within a first time window;
      restricting the velocity vector search space based on avoiding collision with the objects in the vicinity of the vehicle and based on translational and rotational acceleration limits of the vehicle, wherein restricting the velocity vector search space generates a restricted velocity vector search space; and
      maximizing an objective function across the restricted velocity vector search space to select the first desired velocity vector from the restricted velocity vector search space, wherein the objective function measures parameters comprising advancement toward the target goal;
   calculate a first driving control signal configured to navigate the vehicle along the first desired velocity vector when executed by the vehicle maneuvering system;
   adjust at least one of the motive power control, the steering control, and the brake system based on the first driving control signal;
   determine that the vehicle has crossed the lane marker;
   determine, in response to determining that the vehicle has crossed the lane marker, a virtual goal beyond the target goal in the direction of vehicle travel of the indicated lane, and select a second desired velocity vector for directing the vehicle toward the virtual goal by:
      identifying the velocity vector search space based on potential translational and rotational velocities of the vehicle to be achieved within a second time window;
      restricting the velocity vector search space based on avoiding collision with the objects in the vicinity of the vehicle and based on translational and rotational acceleration limits of the vehicle, wherein restricting the velocity vector search space generates the restricted velocity vector search space; and
      maximizing the objective function across the restricted velocity vector search space to select the second desired velocity vector from the restricted velocity vector search space, wherein the objective function measures parameters comprising advancement toward the virtual goal and alignment of a heading of the vehicle with the virtual goal;
   calculate a second driving control signal configured to navigate the vehicle along the second desired velocity vector when executed by the vehicle maneuvering system; and
   adjust at least one of the motive power control, the steering control, and the brake system based on the second driving control signal.

2. The system of claim 1, wherein the instructions, when executed by the hardware processor, are further configured to:
   determine that the vehicle is within a threshold distance of the target goal; and in response to determining that the vehicle is within a threshold distance of the target goal, discontinue the automated lane change maneuver.

3. The system of claim 1, wherein the virtual goal comprises a y-coordinate in the direction of vehicle travel of the indicated lane and an x-coordinate in an x-coordinate direction orthogonal to the y-coordinate and in a direction between adjacent lanes, and the y-coordinate of the virtual goal increases as the vehicle approaches the x-coordinate.

4. The system of claim 3, wherein the y-coordinate of the virtual goal increases proportionately with respect to an inverse of a distance of the vehicle from the x-coordinate of the virtual goal measured in the x-coordinate direction.

5. The system of claim 1, wherein the instructions, when executed by the hardware processor, are further configured to:
restrict the velocity vector search space based on a minimum radius of trajectory curvature.

6. The system of claim 5, wherein the minimum radius of trajectory curvature is proportional to a lane width.

7. The system of claim 1, wherein the instructions, when executed by the hardware processor, are further configured to:
restrict the velocity vector search space based on whether the indicated lane is to a left or right of the lane of vehicle travel.

8. The system of claim 1, wherein the instructions, when executed by the hardware processor, are further configured to:
restrict the velocity vector search space based on a maximum jerk.

9. The system of claim 1, wherein the instructions, when executed by the hardware processor, are further configured to:
restrict the velocity vector search space based on a minimum or maximum admissible velocity.

10. The system of claim 1, wherein the objective function comprises a target heading function that represents alignment of the vehicle with the target goal for the restricted velocity vector search space.

11. The system of claim 1, wherein the objective function comprises a clearance function that represents a distance between the vehicle and a closest intersecting object for the restricted velocity vector search space.

12. The system of claim 1, wherein the objective function comprises a velocity function that represents progress of the vehicle towards the target goal for the restricted velocity vector search space.

13. The system of claim 1, wherein the objective function comprises a weighted summation of a target heading function, a clearance function, and a velocity function.

14. The system of claim 1, wherein:
the virtual goal is configured such that maximizing the objective function adjusts the heading of the vehicle to align with the direction of vehicle travel of the indicated lane before completion of the automated lane change maneuver.

15. The system of claim 1, wherein the instructions, when executed by the hardware processor, are further configured to cause the system to:
end the automated lane change maneuver without the vehicle reaching the virtual goal.

16. They system of claim 1, wherein the instructions, when executed by the hardware processor, are further configured to cause the system to:
determine an x-coordinate of the position of the vehicle within the indicated lane; and
end the automated lane change maneuver based on determining that a $\Delta x$ between the x-coordinate of the vehicle and an x-coordinate of the virtual goal is below a predetermined threshold.

17. A system for directing a vehicle during an automated lane change maneuver on a roadway comprising at least one lane marker, the system comprising:
a lane change instructions interface configured to receive an instruction from a user or from an automated driving controller to change a lane of vehicle travel to an indicated lane;
a vehicle sensor interface configured to receive a geospatial location of the vehicle, a position of the vehicle relative to the lane of vehicle travel and the indicated lane, and positions of objects in a vicinity of the vehicle;
a vehicle control system comprising a hardware processor connected to a memory system comprising instructions executable by the hardware processor, wherein the instructions, when executed by the hardware processor, are configured to cause the system to:
receive the instruction to change the lane of vehicle travel to the indicated lane;
determine a target goal for the position of the vehicle in the indicated lane;
direct the vehicle towards the target goal before the vehicle reaches a predetermined location;
determine that the vehicle has reached the predetermined location;
in response to determining that the vehicle has reached the predetermined location, determine a virtual goal beyond the target goal in the indicated lane and in the direction of vehicle travel of the indicated lane; and
direct the vehicle towards the virtual goal along a desired velocity vector after the vehicle reaches the predetermined location to correct a heading of the vehicle such that the heading aligns with the direction of vehicle travel of the indicated lane;
wherein directing the vehicle towards the virtual goal along the desired velocity vector includes:
identifying a velocity vector search space based on potential translational and rotational velocities of the vehicle to be achieved within a time window;
restricting the velocity vector search space based on avoiding collision with the objects in the vicinity of the vehicle and based on translational and rotational acceleration limits of the vehicle, wherein restricting the velocity vector search space generates a restricted velocity vector search space; and
maximizing an objective function across the restricted velocity vector search space to select the desired velocity vector from the restricted velocity vector search space, wherein the objective function measures parameters comprising advancement toward the virtual goal and alignment of a heading of the vehicle with the virtual goal.

18. The system of claim 17, wherein the predetermined location is a lane marker dividing the lane of vehicle travel and the indicated lane.

19. The system of claim 17, wherein the virtual goal comprises a y-coordinate in the direction of vehicle travel of the indicated lane and an x-coordinate in an x-coordinate direction orthogonal to the y-coordinate and in a direction between adjacent lanes, and the y-coordinate of the virtual goal increases as the vehicle approaches the x-coordinate.

20. The system of claim 19, wherein the y-coordinate of the virtual goal increases proportionately with respect to an inverse of a distance of the vehicle from the x-coordinate of the virtual goal measured in the x-coordinate direction.

21. The system of claim 17, further comprising
a vehicle maneuvering system comprising a motive power control, a steering control, and a brake system wherein the vehicle maneuvering system is configured to receive a driving control signal to adjust at least one of the motive power control, the steering control, and the brake system to cause the vehicle to attain the desired velocity vector.

22. The system of claim 21, wherein the instructions, when executed by the hardware processor, are further configured to:
restrict the velocity vector search space based on a minimum radius of trajectory curvature.

23. The system of claim 22, wherein the minimum radius of trajectory curvature is proportional to a lane width.

24. The system of claim 21, wherein the instructions, when executed by the hardware processor, are further configured to:
restrict the velocity vector search space based on whether the indicated lane is to a left or right of the lane of vehicle travel.

25. The system of claim 21, wherein the instructions, when executed by the hardware processor, are further configured to:
restrict the velocity vector search space based on a maximum jerk.

26. The system of claim 21, wherein the instructions, when executed by the hardware processor, are further configured to:
restrict the velocity vector search space based on a minimum or maximum admissible velocity.

27. The system of claim 21, wherein the objective function comprises a target heading function that represents alignment of the vehicle with the target goal for the restricted velocity vector search space.

28. The system of claim 21, wherein the objective function comprises a clearance function that represents a distance between the vehicle and a closest intersecting object for the restricted velocity vector search space.

29. The system of claim 21, wherein the objective function comprises a velocity function that represents progress of the vehicle towards the target goal for the restricted velocity vector search space.

30. The system of claim 21, wherein the objective function comprises a weighted summation of the target heading function, a clearance function, and a velocity function.

31. The system of claim 17,
wherein directing the vehicle towards the target goal before the vehicle reaches the predetermined location includes:
identifying the velocity vector search space based on potential translational and rotational velocities of the vehicle to be achieved within a time window;
restricting the velocity vector search space based on avoiding collision with objects in the vicinity of the vehicle and based on translational and rotational acceleration limits of the vehicle, wherein restricting the velocity vector search space generates the restricted velocity vector search space;
maximizing the objective function across the restricted velocity vector search space to select a second desired velocity vector from the restricted velocity vector search space, wherein the objective function measures parameters comprising advancement toward the target goal and a target heading function that represents alignment of the heading of the vehicle with the target goal; and
directing the vehicle along the second desired velocity vector.

32. The system of claim 17, wherein the instructions, when executed by the hardware processor, are further configured to cause the system to:
end the automated lane change maneuver without the vehicle reaching the virtual goal.

33. They system of claim 17, wherein the instructions, when executed by the hardware processor, are further configured to cause the system to:
determine an x-coordinate of the position of the vehicle within the indicated lane; and
end the automated lane change maneuver based on determining that a $\Delta x$ between the x-coordinate of the vehicle and an x-coordinate of the virtual goal is below a predetermined threshold.

* * * * *